July 2, 1963     T. A. PASQUINE     3,095,682
COMBINATION RAKE AND CARRIER
Filed June 30, 1961
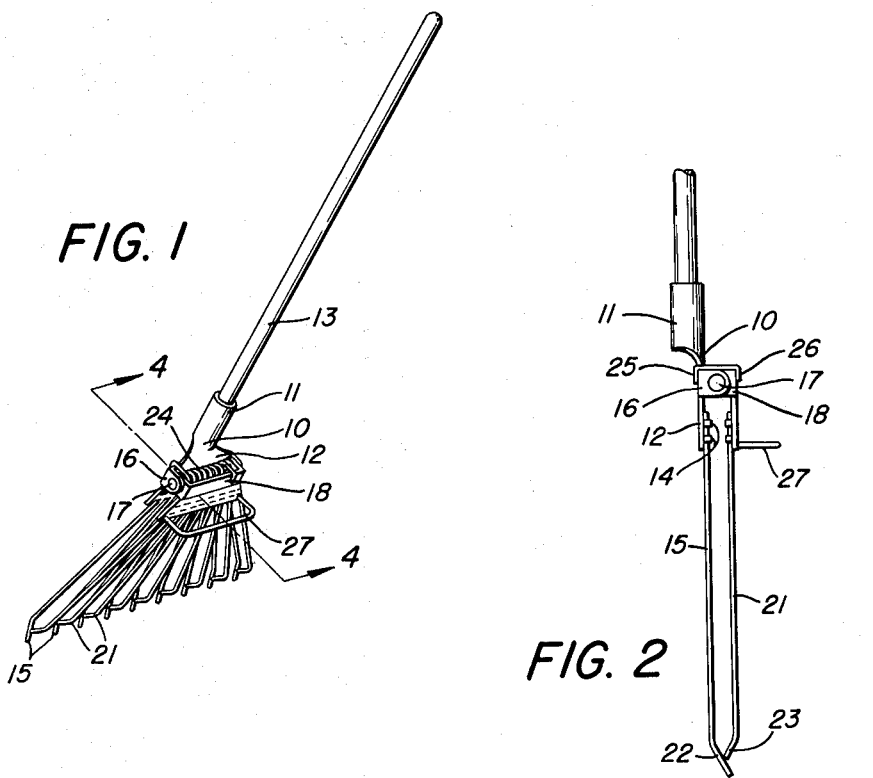
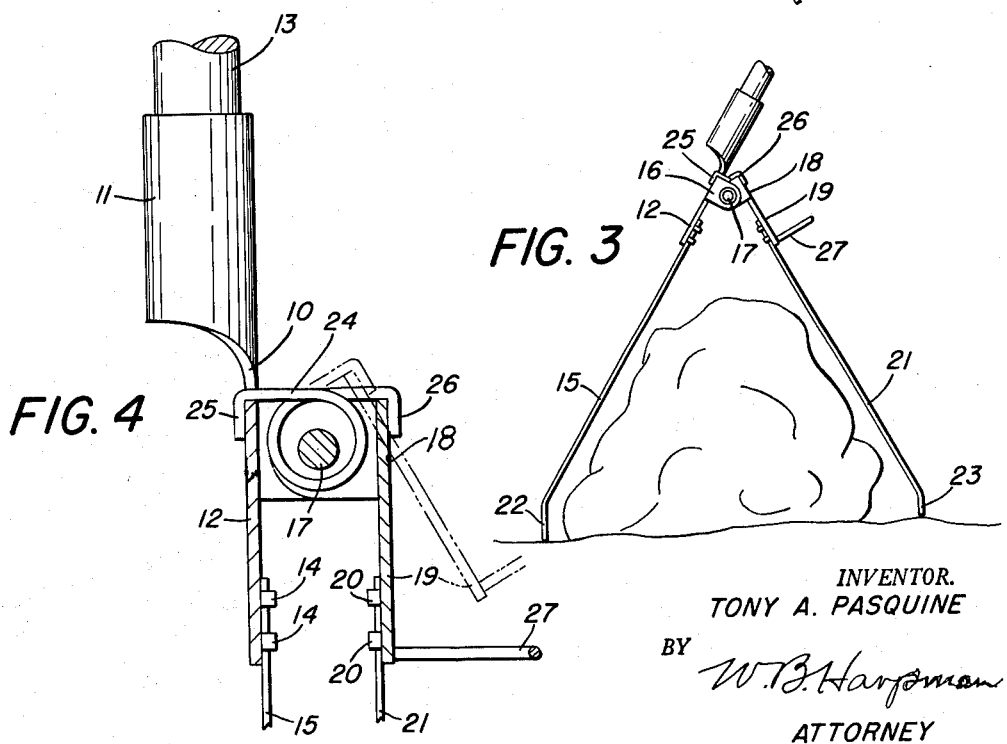
INVENTOR.
TONY A. PASQUINE
BY
ATTORNEY United States Patent Office 3,095,682
Patented July 2, 1963

3,095,682
COMBINATION RAKE AND CARRIER
Tony A. Pasquine, 1750 Lucretia Drive, Girard, Ohio
Filed June 30, 1961, Ser. No. 127,783
3 Claims. (Cl. 56—400.12)

This invention relates to a leaf rake and the like and more particularly to a rake incorporating a second rake assembly so arranged to be used in connection with the principal rake assembly in carrying material such as leaves and grass.

The principal object of the invention is the provision of a combined rake and leaf carrier.

A further object of the invention is the provision of a combined leaf rake and carrier in which the carrier is arranged for semi-automatic operation.

A still further object of the invention is the provision of a combined rake and leaf carrier in which the device is arranged for manual operation by the foot of the user.

A still further object of the invention is the provision of a combined leaf rake and carrier in which the carrier is arranged to permit normal or regular use of the leaf rake.

A still further object of the invention is the provision of a combined leaf rake and carrier which is a simple and economical construction.

The combined leaf rake and carrier disclosed herein comprises an improvement in the art relating to leaf or grass rakes and which include a plurality of elongated resilient metal tines secured to a single handle and useful in raking a lawn with a sweeping action. Such rakes which are commonly referred to as grass rakes or leaf rakes are capable of being used on a lawn to remove grass clippings or leaves therefrom without damaging the lawn and are widely used for that purpose. It has heretofore been necessary to rake such grass clippings into a pile and pick them up for removal. To assist in such operation, users have frequently, held the grass rake against the one side of a pile of grass clippings or leaves and used their free hand against the other side of the pile of leaves or grass in an attempt to hold a portion of the pile against the rake and permit it to be lifted up and carried.

The present invention provides a convenient readily usable device operating in conjunction with the regular leaf rake to move a second leaf rake resilient tine assembly into engagement therewith or into proximity thereto so that it will engage and hold leaves or grass therebetween which may then be picked up and carried thereby.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

FIGURE 1 is a perspective view of the combined leaf rake and carrier.

FIGURE 2 is an enlarged end elevation of the combined leaf rake and carrier with part of the handle broken away.

FIGURE 3 is an end elevation of part of the combined leaf rake and carrier showing the same in position to hold leaves or grass.

FIGURE 4 is an enlarged detail with parts in cross section on line 4—4 of FIGURE 1 with broken lines indicating an alternate position of a portion thereof.

By referring to the drawings and FIGURE 1 in particular, it will be seen that a combined leaf rake and carrier has been illustrated which comprises a body member 10 having a tubular socket 11 thereon. A handle 13 is positioned in the tubular socket 11 and extends thereabove. A flat downward extension 12 of the body member 10 has a plurality of tongues 14, 14 formed therefrom in substantially vertically arranged pairs as best seen in FIGURES 2 and 4 of the drawings. Resilient metal tines 15, 15 are positioned one in each of said pairs of tongues 14 and the tongues 14 are crimped thereover to tightly hold the tines in fixed position relative to said flat extension 12.

Those skilled in the art will observe that the flat extension 12 is of a modified fan shape with the smallest portion upwardly so that the tines 15—15 extend in the same modified fan shape downwardly and sidewardly with respect thereto to form the leaf rake shown in FIGURE 1. The flat extension 12 includes a pair of side, rearwardly extending hinge ears 16 which are apertured adjacent their outermost ends to receive a pivot pin 17 transversely thereof. The pivot pin 17 engages aligned apertures in the ends of a U-shaped body 18 which also includes a secondary flat downward extension 19 which is provided with substantially vertically arranged pairs of secondary tongues 20, 20. Secondary resilient metal tines 21, 21 are positioned one through each of the respective pairs of secondary tongues 20 and the same are crimped thereover as best shown in FIGURES 2 and 4 of the drawings.

By referring to FIGURES 1 and 2 in particular, it will be observed that the secondary tines 21, 21 are shorter than the tines 15, 15 so that their lowermost ends terminate above the lowermost ends of the tines 15, 15. It will also be observed that the lowermost ends of the tines 15, 15 are angularly disposed as at 22, 22 and the lowermost ends of the tines 21, 21 are angularly disposed in an opposite direction as at 23, 23. The ends 23, 23 are also shorter than the ends 21, 21.

By referring to FIGURES 1 and 4 of the drawings, it will be observed that a coil spring 24 is positioned about the pivot pin 17 with its opposite ends 25 and 26 having right angular sections engaged over the flat extensions 12 and 19 respectively and normally urging the secondary flat extension 19 toward the flat extension 12 to the position shown in FIGURES 1, 2 and 4 of the drawings.

A U-shaped handle 27 is secured at its ends to the secondary flat extension 19 and extends sidewardly therefrom to form a squared loop in which the toe of the shoe of a user may be engaged to swing the tines 21, 21 outwardly and away from the tines 15, 15 as shown in broken lines in FIGURE 4 and in solid lines in FIGURE 3. In such position, the coil spring 24 will be tensioned so that upon the releasing of the U-shaped handle 27 the coil spring 24 will attempt to move the tines 21, 21 toward the tines 15, 15 and thereby hold grass or leaves therebetween.

It will thus be seen that a simple and efficient combined leaf rake and carrier has been disclosed which meets the several objects of the invention, and having thus described my invention, what I claim is:

1. A combined rake and carrier, comprising a flat body member having a top part formed for the attachment of a handle thereto, said member having a forward side, a rearward side, and lateral widely spaced side edges, hinge ear members on and extending rearwardly from said side edges, a plurality of rake tines, each attached at one end to and extending downwardly from the body member, said tines lying in a common plane and being spaced apart transversely of the body member, each of said tines having a portion of its other, and lower, end extending at an obtuse angle downwardly and rearwardly, a second body member extending across the rear side of the first body member and spaced rearwardly from and substantially paralleling the first body member, means pivotally coupling said second body member to said hinge ear members for pivoting on an axis extending transversely of the members, a plurality of secondary tines each secured at one end to and extending downwardly from the second body member, said secondary tines being spaced apart transversely of the second body member and lying in a common plane, each of said secondary tines having a portion of its other, and lower end extending at an obtuse angle downwardly and forwardly and terminating an appreciable distance above, or short of, the said other, lower ends of the rake tines when the secondary tines are pivoted forwardly into a closed relation with the rake tines, and spring means operatively connecting said body members and biased to urge the same and the tines into said closed relation.

2. The invention according to claim 1, wherein the planes of the rake tines and secondary tines are in spaced apart substantially parallel relation in the said closed relation of the rake and secondary tines and when in such closed relation the said angled other end portions of the rake tines and the said angled other end portions of the secondary tines are in convergent relation.

3. The invention according to claim 1, with a toe bar disposed across and spaced rearwardly from the second body member and having end portions secured to the second body member.

References Cited in the file of this patent

UNITED STATES PATENTS

| | | |
|---|---|---|
| 1,882,423 | Holz | Oct. 11, 1932 |
| 2,504,943 | Zifferer | Apr. 18, 1950 |
| 2,746,235 | Kautenberg | May 22, 1956 |